(12) United States Patent
Manucha et al.

(10) Patent No.: US 7,406,472 B2
(45) Date of Patent: Jul. 29, 2008

(54) INTEGRATED IMPORT/EXPORT SYSTEM

(75) Inventors: Rajiv Manucha, Toronto (CA); Steven L. Crozier, Toronto (CA); Paul R. Constanzo, Pickering (CA); Lynn Lefevre, Markham (CA)

(73) Assignee: Management Systems Resources, Inc., Toronto, Ontario (CA)

(*) Notice: Subject to any disclaimer, the term of this patent is extended or adjusted under 35 U.S.C. 154(b) by 1234 days.

(21) Appl. No.: 10/024,681

(22) Filed: Dec. 18, 2001

(65) Prior Publication Data

US 2003/0115072 A1    Jun. 19, 2003

(51) Int. Cl.
| | |
|---|---|
| G06F 7/00 | (2006.01) |
| G06F 17/30 | (2006.01) |
| G06F 15/16 | (2006.01) |
| G06Q 40/00 | (2006.01) |
| H04K 1/00 | (2006.01) |
| H04L 9/00 | (2006.01) |
| G06Q 30/00 | (2006.01) |

(52) U.S. Cl. ............... 707/10; 705/1; 705/26; 705/37; 705/38; 705/39; 705/77; 709/219

(58) Field of Classification Search ........ 707/1–4, 707/9, 10, 100, 102, 104.1; 705/80, 8, 22–23, 705/26, 24, 1, 37–39, 77; 709/219
See application file for complete search history.

(56) References Cited

U.S. PATENT DOCUMENTS

| | | | |
|---|---|---|---|
| 6,460,020 B1 * | 10/2002 | Pool et al. ............... 705/26 |
| 6,598,027 B1 * | 7/2003 | Breen, Jr. et al. ........... 705/26 |
| 6,785,718 B2 * | 8/2004 | Hancock et al. ............ 709/219 |
| 2002/0013739 A1 * | 1/2002 | O'Donnell et al. ........... 705/26 |
| 2002/0062280 A1 * | 5/2002 | Zachariassen et al. ....... 705/39 |
| 2002/0152133 A1 * | 10/2002 | King et al. ................. 705/26 |
| 2002/0169658 A1 * | 11/2002 | Adler ....................... 705/10 |
| 2003/0009361 A1 * | 1/2003 | Hancock et al. .............. 705/7 |
| 2003/0061058 A1 * | 3/2003 | Dutta et al. .................. 705/1 |
| 2003/0065949 A1 * | 4/2003 | Le et al. .................... 713/201 |
| 2003/0069831 A1 * | 4/2003 | Le et al. ..................... 705/37 |
| 2004/0243690 A1 * | 12/2004 | Hancock et al. ............ 709/219 |

* cited by examiner

*Primary Examiner*—Don Wong
*Assistant Examiner*—Cheryl M Shechtman
(74) *Attorney, Agent, or Firm*—Wong, Cabello, Lutsch, Rutherford, Brucculeri, LLP

(57) ABSTRACT

An integrated import/export system includes a database of records relating to a plurality of shipments of goods, a database server and an application server. The application server communicates with the database server to provide members of a supply chain for a shipment of goods an opportunity to modify records relating to the shipment. As the shipment moves through the supply chain, the records relating to the shipment may be repeatedly updated and accessed by interested parties such as customs brokers and government officials. A central repository for such data minimizes errors from repetitive data entry and provides a more complete source of information relating to the shipment than is typically associated with a shipment at any time in transit.

13 Claims, 5 Drawing Sheets

INTEGRATED IMPORT/EXPORT SYSTEM

FIELD OF THE INVENTION

The present invention relates to importing and exporting and, more particularly, to a method, apparatus and integrated import/export system for importing and exporting goods across jurisdictional boundaries.

BACKGROUND OF THE INVENTION

The importing and exporting of goods across jurisdictional boundaries, such as between states or nations, is a well-known phenomenon. As a result of increased globalization, free trade agreements and the rise of multinational corporations, the trade in goods across borders continues to grow and accelerate.

Due to a desire for governments of all kinds to track goods leaving and entering a jurisdiction, significant reporting must occur prior to goods crossing a border. However, most governments are far more concerned with the goods entering than those leaving. As a result of this dichotomy, the data required to export a product from a jurisdiction is typically significantly less detailed than the data required for government clearance required for the same product on entry into the same jurisdiction.

In addition to the differences in data required for import as compared to export, different governments have different requirements as to the data required for goods to cross their borders. For example, some governments, such as those subscribing to protectionist import policies, require a tremendous amount of data prior to clearing goods for importation. In contrast, some free trading countries require almost minimal data for the importation of the same goods. As a result of these regional differences, entities that are in a business that spans many jurisdictions have tremendous difficulty in keeping track of the various requirements for shipping their goods exported and imported between a large number of jurisdictions.

Further complicating matters is the typical separation between the exporter and the importer. In many situations, an exporting company located in a first jurisdiction will sell goods to an importer in a second jurisdiction. The exporter is typically concerned with the ability to have the sold goods exit the first jurisdiction leaving the importer to arrange for the government clearance required to enable entry of the goods into the second jurisdiction. However, due to the differences in the reporting requirements required for exporting as compared to importing, difficulties often arise which may strand the goods being shipped in limbo between the two jurisdictions. An entire brokerage industry has sprung forth to smooth and overcome these difficulties.

Despite the existence of the brokerage industry, problems in systems and methods designed to smooth and ease transit of products between jurisdictions still exist. These problems, which are typically overcome after much effort, often result in delays in receipt of the goods by the importing party. As a result of these delays, the parties or the goods themselves may be damaged. For example, an importing party, in many cases, may not pay for the goods until they are received. Delays resulting from shipment difficulties may result in significant carrying costs to the exporting party. Additionally, the importer may have customers that critically require the goods being imported. Any delays resulting from difficulties during export or import of goods may cascade down the supply chain to the ultimate consumers of the goods in question. Additionally, many goods are sensitive to delays and may be permanently and detrimentally damaged by delays experienced during transit.

In addition to difficulties described above, many other difficulties are encountered during the shipment of goods between jurisdictions. For example, due to the many people and operations currently involved in the export and import of goods, there exists the likelihood that errors will creep into systems designed to assist in these types of transactions. In most systems presently available, an exporter will manually enter data in a computer system designed to assist in the export of products. The data entered into the export system typically includes data about the products, the exporting entity, the destination and the importing entity. From this data, these export systems will generate the necessary physical or electronic documents necessary for clearance by the exporting jurisdiction. However, upon reaching the importing jurisdiction, additional information is typically required by the government of the import jurisdiction. Brokers, assisting in the shipment of the goods in question, then contact the various parties, manually enter the required information received from the parties, as well as information garnered from the export documentation, into an import computer system. The import system is then able to generate the documentation required for clearance by the importing jurisdiction. However, due to the manual entry by many parties, keying errors often result. These keying errors add additional difficulties and delays into an already cumbersome process.

Accordingly, it is desirable to provide a method and system for the exportation and/or importation of goods, which addresses these problems.

SUMMARY OF THE INVENTION

Advantageously, embodiments of the present invention provide an integrated import/export system which is accessible by all members in the supply chain (e.g., i.e., those handling the goods, including manufacturers/exporters, customers/importers, brokers, shipping organizations, freight forwarders, warehousing organizations, etc.). As a result, each member of the supply chain may (assuming the member has the proper security authorization) enter, update or delete data relating to a particular shipment of goods.

The system enables each member of the supply chain to use data that may have already been input into the system by others, thereby reducing duplicative efforts in data entry. Additionally, as a consequence of all the data relating to the entire transaction or process residing in a single location (which may be accessed virtually from any location using wide area data networks), any difficulties encountered during the shipment process (e.g., difficulties in clearing customs) are more easily rectified than in present systems. Embodiments of the present system provide a "one-stop shop" or single data repository relating to each transaction.

Moreover, embodiments of the system may interface with the databases and data repositories of members of the supply chain. As a consequence of this interface, data relating to a member's portion of the transaction which resides in the member's databases can be transferred electronically to the system. This further reduces the time and costs of the transaction as much manual data entry is not required.

Unlike present systems designed to assist in the transit of goods across borders, embodiments of the present invention enable importers or exporters to analyze shipments in detail, either retrospectively (i.e., analyze shipments which have already occurred) or prospectively (i.e., analyze proposed shipments).

Additionally, embodiments of the invention may access databases maintained by the various jurisdictional governments that are involved with trans-border shipments. These databases, which include data regarding tariffs and the like, may be accessed on a regular basis, thus ensuring that the proper tariffs, duties and other taxes are used in calculating government fees. Additionally, many governments provide electronic facilities to allow for the electronic submission of shipment documentation. Embodiments of the invention submit necessary documentation using these electronic facilities. Additionally, embodiments of the invention are able, either automatically or when prompted by a user, to query government databases to determine clearance status of shipments being managed by the system. Other aspects and advantages of the system are described herein.

In one aspect of the invention there is provided an integrated import/export system. The integrated import/export system includes a database of records relating to a plurality of shipments of goods, where said goods are shipped between at least two jurisdictions, each record having information relating to at least a first jurisdiction and a second jurisdiction, a database server in communication with said database and an application server in communication with said database server for providing a user interface to at least one client, each said client associated with a member of a supply chain for a particular one of said plurality of shipments of said goods, said interface allowing each said member to modify at least a portion of a record relating to said particular one of said plurality of shipments of said goods.

In a further aspect of the invention there is provided a method of operating an integrated import/export system. The method includes maintaining a database of records relating to a plurality of shipments of goods between at least two jurisdictions, providing an interface for accessing particular ones of said records in said database to a member of a supply chain for said particular ones of said plurality of shipments of said goods, receiving, from said member, an instruction to modify one of said particular ones of said records relating to said particular one of said plurality of shipments and modifying said one of said records according to said instruction. In a still further aspect of the present invention, there is provided a software medium that permits a general purpose computer to carry out this method.

In a still further aspect of the invention there is provided a record editing system in communication with an integrated import/export system. The record editing system is operable to display an interface to a member of a supply chain for a particular shipment of goods, said interface allowing interaction with a database of records relating to said shipment of goods maintained at said integrated import/export system, where said goods are shipped between at least two jurisdictions and receive, from said member, instructions to modify a record relating to said shipment of goods.

In an even further aspect of the invention there is provided a method of modifying a transaction. The method includes receiving a communication initiation from a party to said transaction, sending a description of an interface for allowing said party to provide an transaction identifier of said transaction and additional data for said transaction, receiving said transaction identifier of said transaction and said additional data for said transaction and modifying an entry in a database identified by said transaction identifier to include said additional data.

In another aspect of the invention there is provided method of allowing shipment analysis. The method includes receiving an indication of a proposed shipment from a first jurisdiction to a second jurisdiction and based on said indication, providing a first metric for said proposed shipment, said first metric derived from data in a database relating to previous shipments from said first jurisdiction to said second jurisdiction.

In still another aspect of the invention there is provided a database comprising a plurality of shipment tables, each said shipment table having a unique field identifying record number, a plurality of keys for linking said shipment tables to uniquely identify shipments and documents associated with said shipments. The plurality of shipment tables includes: a table for shipment identities; a table for shipment consolidation information; a table for shipment information; a table for shipment economic transaction information; a table for line item detail information; a table for customs entry information; a table for jurisdictional document information; a table for item classification information; a table for item master information; and a table for other government department information.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood with reference to the following detailed description read in conjunction with the drawings, in which.

DETAILED DESCRIPTION

Figure 1:
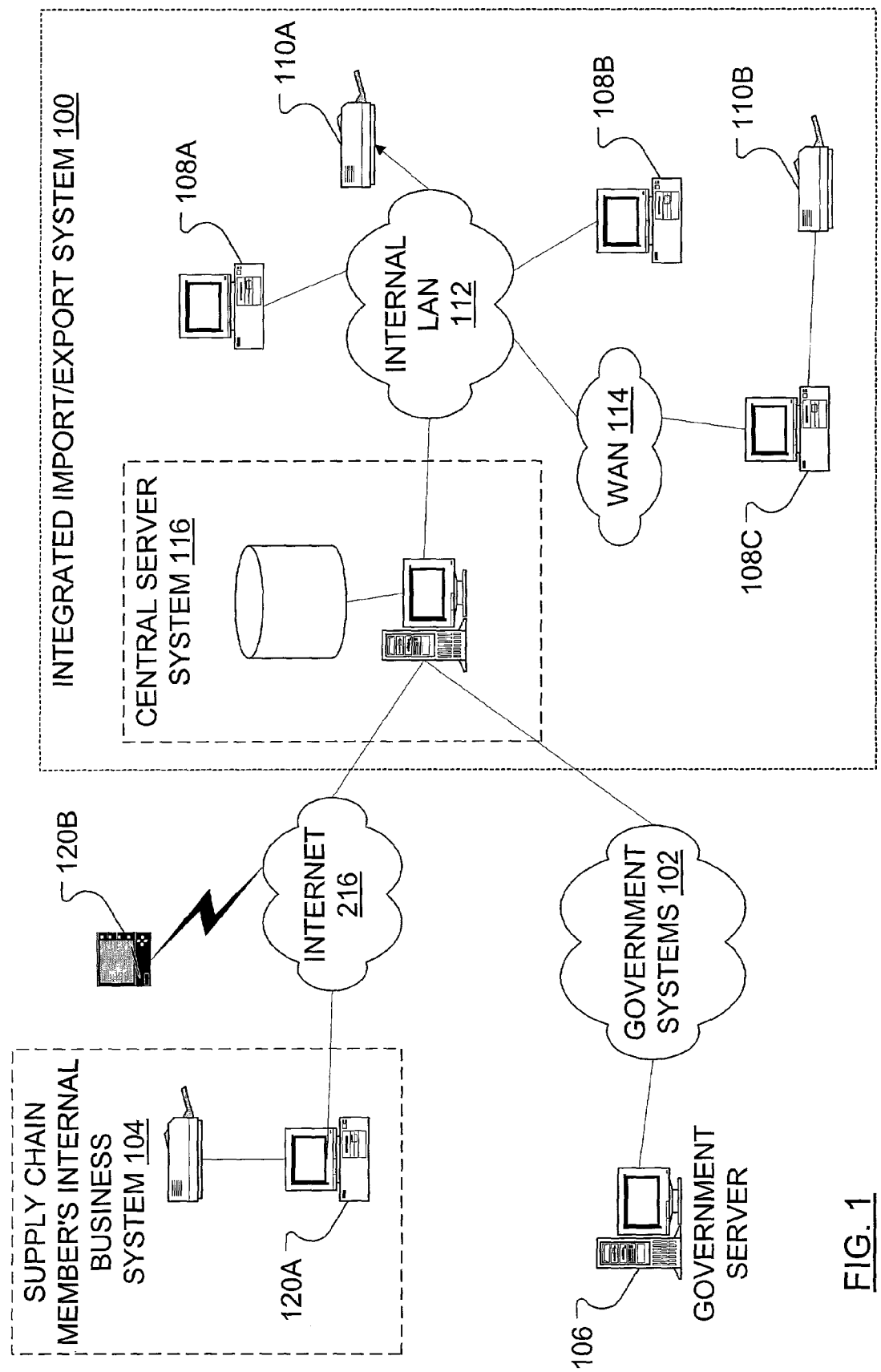
FIG. 1 is schematic of an import/export system exemplary of an embodiment of the present invention.

An exemplary integrated import/export system (IIES) is illustrated in FIG. 1 and generally designated as system 100. System 100 includes those components illustrated on the right hand side of the page of FIG. 1. As illustrated, IIES 100 is in communication with numerous exemplary electronic systems. Illustrated in FIG. 1 are the electronic systems of various government agencies 102, including a server 106, and electronic systems of members of the supply chain 104. These electronic systems 102, 104 are provisioned to communicate with the IIES 100 using well known electronic networks such as, for example, the public Internet, virtual private networks (VPNs), the Public Switched Telephone Network, private intranet, wireless communication networks and the like.

Various members of the supply chain (i.e., those parties or organizations that are involved in a trans-border shipment or transaction (used interchangeably throughout this description)—e.g., manufacturers/exporters, customers/importers, customers' brokers, shipping organizations, freight forwarders, warehousing organizations, etc.—may communicate with IIES 100 using various communication networks and computer terminals. For example, two computer terminals 120 of supply chain members are illustrated in FIG. 1. The first computer terminal 120A is a conventional computer, adapted as described herein, which communicates with IIES 100 using a conventional wire line connection to a public network such as the Internet 216. In contrast, second computer terminal 120B is a hand held or tablet-type computer terminal which communicates with IIES 100 using a combination of a public network, such as the Internet 216, and wireless network communication. As indicated above, other physical links between IIES 100 and government agencies 102 or supply chain member systems 104 could be also be employed.

IIES 100 includes a main or central server system 116 communicating with client computer terminals 108 (three such computer terminals are illustrated—108A, 108B, 108C). Communication between computer terminals 108 and central server system 116 may be enabled using known electronic networking systems and protocols such as, for example, networks using the Ethernet, TCP/IP, token ring protocols or the like. Additionally, the communication networks used may include various physical interfaces such as wire, wireless, optical infrastructure or combinations thereof.

It should be noted that while the exemplary embodiment of IIES 100 is illustrated as a client-server architecture, other architectures may equally be employed (e.g., IIES may be a single device). However, it is believed that in many commercial environments, a client-server architecture for IIES 100 will likely be preferred.

Figure 2:
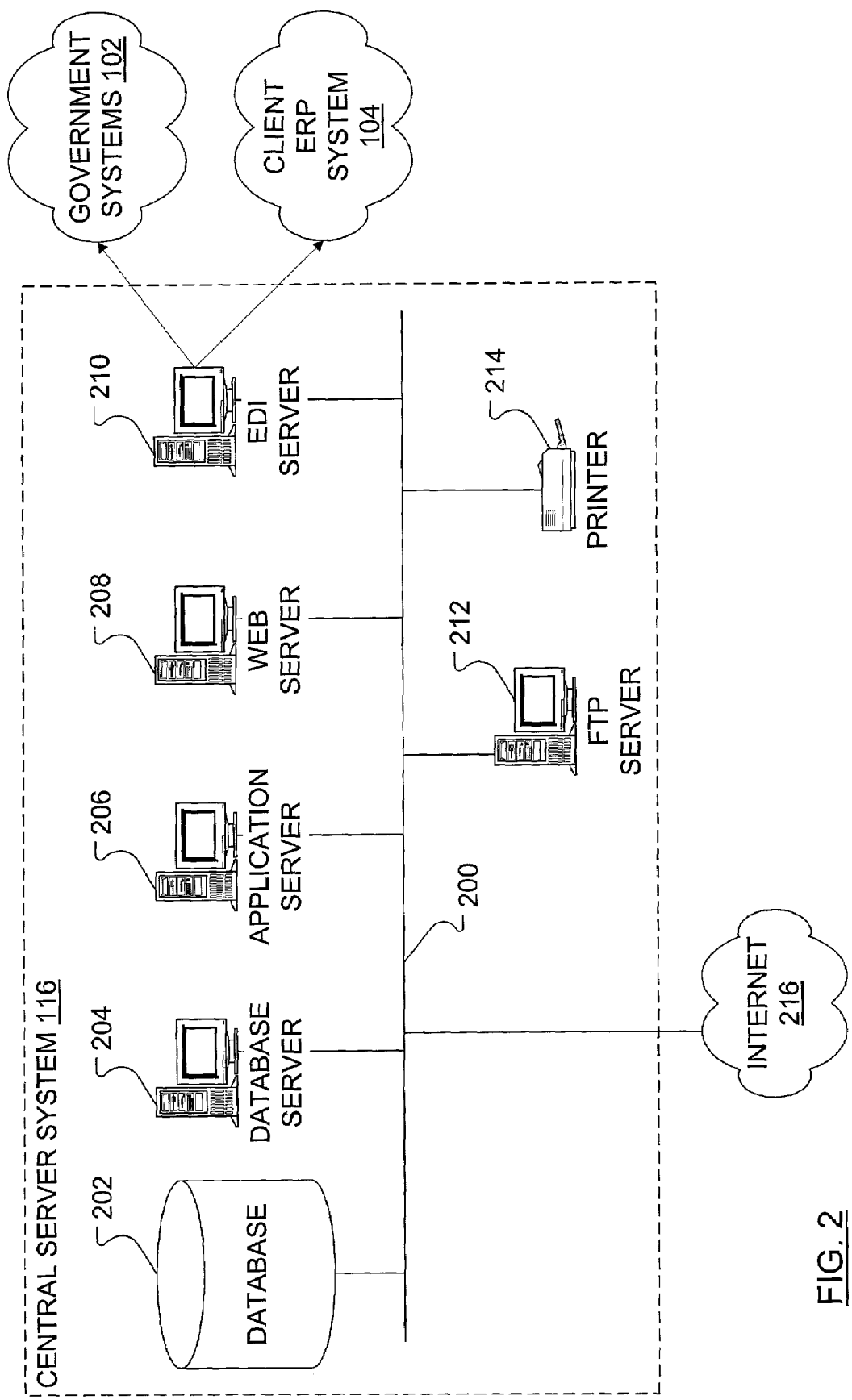
FIG. 2 is a schematic of a portion of the import/export system of FIG. 1.

As IIES 100 uses, in the exemplary embodiment, a client-server architecture, computer terminals 108, 120 may include client software which enables communication with central server system 116. This client software, which provides textual or graphical interface for users of computer terminals 108, 120, enables communication with various aspects of the central server system 116 including, for example, client software to access database 202, a web browser (e.g., Netscape Communicator™ from Netscape, Internet Explorer™ from Microsoft) to communicate with web server 208 and communications software to enable network communication with central server system 116 (FIG. 2). The communication software on a computer terminal 108, 120 may include, for example, TCP/IP, HTTP, telnet, modem and ftp protocols. Additionally, some computer terminals 108, 120 may be in communication with other computer terminals in the same organization using a private network (i.e., internal computer terminals—not shown). Those computer terminals 108, 120 that also communicate with internal computer terminals may have access to data stored in various databases maintained by the organization. These databases may include, for example, databases relating to accounting information, Enterprise Resource Planning (ERP) databases, inventory databases and the like. Information from these internal databases may be retrieved by computer terminals 108, 120 and transmitted to central server system 116.

Central server system 116 is illustrated in greater detail in FIG. 2. The exemplary central server system 116 illustrated in FIG. 2 includes a communications network 200 providing a suitable communications link between the components of central server system 116. Network 200 may be implemented using conventional networking technologies such as 10 Mbps or 100 Mbps Ethernet networks. As will be appreciated by those of ordinary skill in the art, other networking technologies and topologies could also be employed.

Communications network 200 enables communication between a database server 204, an application server 206, a web server 208, an electronic data interchange (EDI) server 210, a file transfer protocol (ftp) or communications server 212 and an output device (illustrated as a printer) 214. Additionally, communications network 200 enables each of the various components of central server system 116 to communicate with external networks 216. External networks 216 may include, for example, the Internet (illustrated), PSTN, ATM networks, SONET networks or the like.

Database server 204 hosts database 202 which stores data received from users of the IIES 100, supply chain members 104 and government systems 102. Additionally, data stored by database 202 will, responsive to queries, transmit data to computer servers 204-212 and computer terminals/systems 102, 104 and 108.

Figure 4:
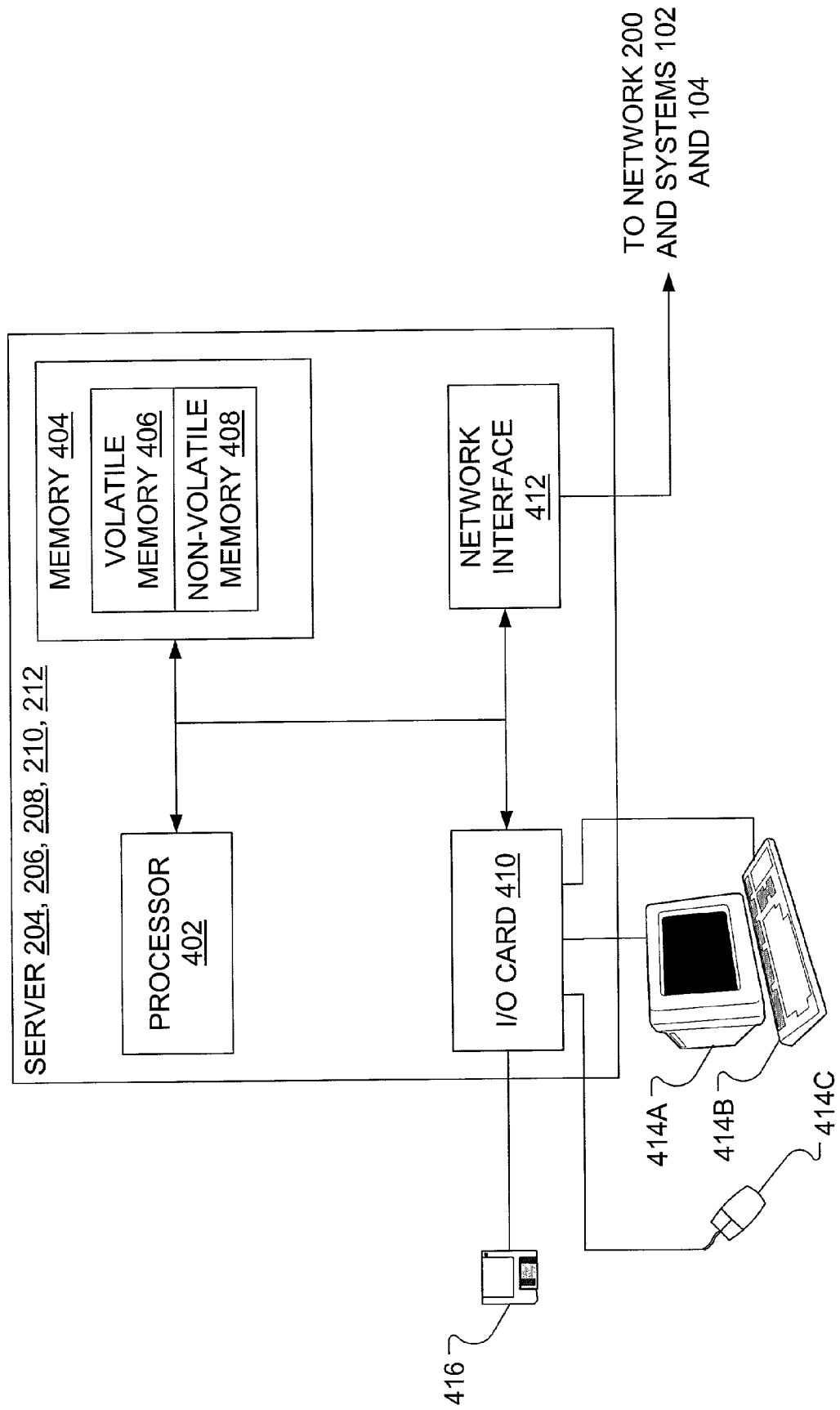

Generally, servers 204-212, illustrated schematically in FIG. 4, include a processor 402 in communication, over a suitable communications bus, with memory 404, input/output (I/O) card 410 and network interface 412.

Memory 404, which, in the exemplary embodiment, includes both volatile memory 406 (e.g., RAM, VRAM, FLASH, etc.) and non-volatile (or persistent) memory 408 (e.g., hard or fixed disks, CD-ROM, optical and magneto-optical drives, ZIP™ drives, etc.), is used for the storage of computer readable instructions or codes which, when retrieved and executed by processor 402, adapts individual servers 204-212 to perform the respective functions and operations described herein.

I/O card 410 enables servers 204-212 to receive and transmit data signals to and from input and output devices. In the exemplary embodiment three such I/O devices are illustrated—a display 414A, a keyboard 414B and a mouse 414C for receiving user instructions and displaying or presenting data to a user in text and/or graphical format. Persons of ordinary skill in the art will appreciate that other input and output devices could also be employed. I/O card 410 also enables computer readable instructions and code to be received from and transmitted to computer readable medium 416 (illustrated, for exemplary purposes only, as a diskette).

Network interface (I/F) 412 may include one or more different network communication devices such as, for example, a modem, Ethernet adapter, token ring adapter or the like. Network I/F 412 enables data signals to be transmitted to and received from various network enabled devices and systems such as, for example, network 200 and computer terminals/systems 102, 104, 108.

Figure 3:
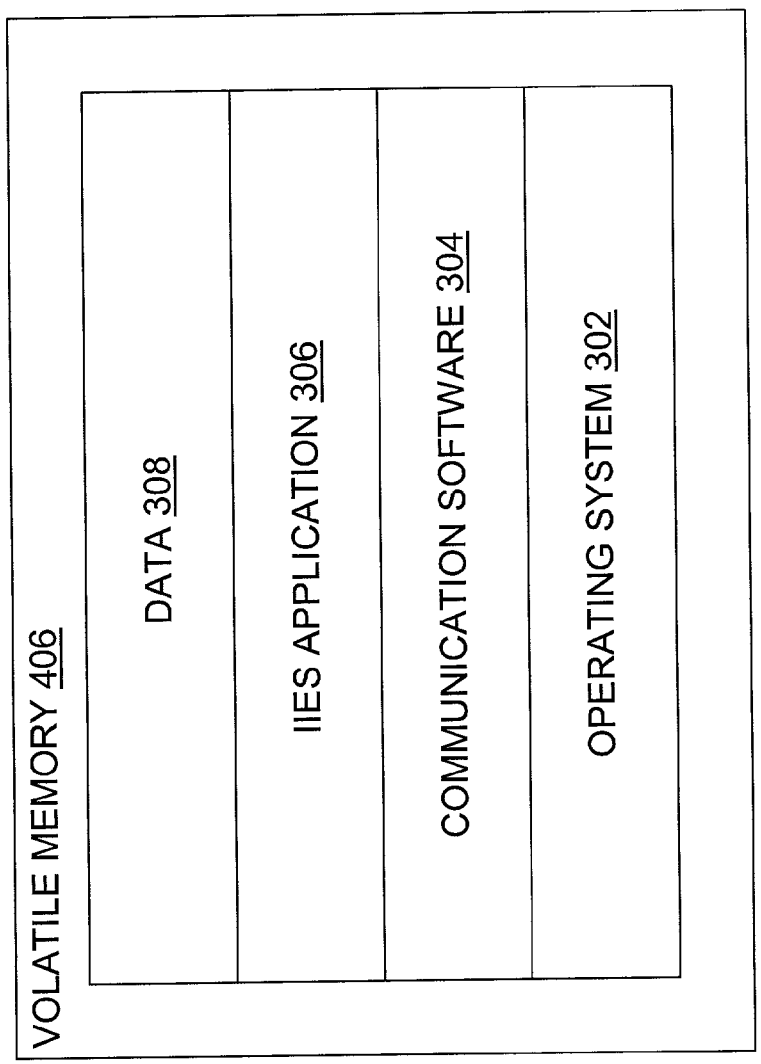
FIGS. 3 and 4 are schematics of portions of FIG. 2.

As indicated above, memory 404 provides volatile and persistent storage for computer readable instructions, codes and data. Memory 404 for servers 204-212 is illustrated in functional block form in FIG. 3. As illustrated, memory 404 includes operating system (OS) 302, communication software (s/w) 304, IIES applications 306 and data portion 308.

OS 302 may be implemented using a conventional (and, in many environments, preferably multi-tasking) operating system such as, for example, Windows NT, Linux or a flavor of UNIX. Interfacing with OS 302 is communication s/w 304 which provides the necessary protocols and protocol stacks to enable communication with network I/F 412 (FIG. 4). Communication s/w 304 may provide one or more known communication protocols such as, for example, TCP/IP, Ethernet, token ring, telnet, ftp, HTTP and the like. Additionally, OS 306 and communication s/w 304 interface and provide software services to IIES applications 306 which are described in greater detail below. Data portion 308 provides sufficient storage for OS 302, communication s/w 304 and IIES applications 306 required for normal operation.

IIES applications 306 will vary for each of servers 204-212 with operations performed by respective IIES applications 306 reflective of the name of the servers (e.g., database server 204, application server 206, web server 208, EDI server 210 and ftp server 212).

Application server 206, included in IIES applications 306, takes requests from the web server 208 and processes them and returns the result back to the web server 208. The requests are usually data manipulation requests and it will closely interact with the Database Server 204. Application server 206 will also process and format the web pages prior to returning them back to the web server 208 performing functions that the web server 208 cannot do itself due to inherent web server limitations. In most cases, application server 206 will have Windows NT™ from Microsoft as the operating system and a software package called ColdFusion® Server distributed by Allaire Corporation.

Web server 208 includes in IIES applications 306 web server hosting software capable of receiving HTTP requests, receiving data posted to HTML or XML pages, interpreting received requests, retrieving requested web pages (e.g., HTML or XML pages), transmitting retrieved pages and transmitting other data through use of HTTP. Web server hosting software may be provided using conventional web server software such as Apache HTTP Server available from the Apache Software Foundation—details of which are available from www.apache.org.

ftp server 212 includes in IIES applications 306 a file transfer protocol (ftp) daemon enabling receipt and transmission of data files using the file transfer protocol.

EDI server 210 includes in IIES applications 306 software to receive and access data used in the various and disparate government and supply chain member systems 102, 104 (FIG. 1).

Database server 204 includes, as part of IIES applications 306, a database management system (DBMS) which hosts database 202. DBMS in the exemplary embodiment is implemented using convention relational database management (RDBMS) software such as those available from IBM™, Microsoft, Oracle and the like. DBMS operates to create, maintain, update, query and otherwise control data stored in data tables which form database 202. Additionally, IIES applications 306 of database server 204 include an Open Data Base Connectivity (ODBC) server to enable received ODBC compliant messages to be interpreted and executed by DBMS and, additionally, to generate and transmit ODBC compliant messages.

Database 202 contains tables (not shown) that store data pertinent to each transaction. Each transaction will preferably be identified by a unique identifier that is referenced by various data fields. The unique transaction identifier is then used (either directly or indirectly through use of other indicia) by database server 204 to suitably store data being received from servers 206-212, user systems 108 and government and supply chain member systems 102, 104 into the various tables defined. As will be appreciated by those of ordinary skill in the art, the number of tables, the organization of the data fields defining these tables and the data contained therein is extremely flexible depending upon the environment in which embodiments of the invention are deployed, the scope and scale of these embodiments and the features offered by these embodiments. However, it is generally believed by the inventors that in many instances the following tables (or variations thereof) may be suitable: a shipment identifier table, a basic shipment consolidation detail table, a charge table, a shipment header table, an economic transaction table, a packaging table, a line item detail table, a customs entry data table, an authorization data table, a port shipment table, a document table, a country data table, a contact data table, a waybill data table, a tax code table, an item classification table, an item master table, an Other Government Departments (OGD) data table.

The function of each of the above-identified tables is described below. However, and as will be appreciated by those of ordinary skill in the art, the data in tables identified above could be reorganized to form a lesser or greater number of tables. Other data fields or tables may also be included depending upon the environment into which embodiments of the present invention are deployed. Additionally, the scope of services provided by embodiments of the present invention (e.g., the features made available to users) will dictate the type of data collected and stored by database 202. For example, additional tables storing data relating to security and authorization parameters may be included, if desired. Additionally, various keys (primary and foreign keys) and the referential integrity rules employed to maintain the various relations between tables may also be modified.

A shipment identifier table includes data that is used throughout the processing of a shipment from origin (e.g., manufacturer) to ultimate destination (e.g., customer) to uniquely identify the shipment. This may include, for example, a unique user defined field (UDF) record number, a unique shipment consolidation number and the like. In the exemplary embodiment, the unique UDF record number is the primary key of this table and uniquely identifies the entire transaction. The other unique identifiers are used to uniquely identify portions of the entire transaction (e.g., shipment, point of entry data, packaging information, etc.). These data fields (or columns) in this table reference the primary key columns of other tables. Consequently, with the exception of the UDF record number, the columns identified above are foreign key columns. In the exemplary embodiment a delete restrict is placed on the primary key and foreign key columns. However, other referential integrity rules could be used.

A shipment consolidation detail table provides general details relating to a single shipment. Uniquely identifying a single shipment is a unique consolidation record number which acts as the primary key column for this table and is referenced by a similarly named column in the shipment identifier table. Included in this table is data relating to, for example, country of origin, place of export, country (or countries) of trans-shipment, declarer, shipment vessel identifier, port of exit, dangerous goods data, ports of entry, release and unloading, delivery times (e.g., estimate time of departure, time of departure, estimated time of arrival, time of arrival, estimated delivery date, delivery date), master waybill data (number, date, type), and the like. Other data could also be included. However, it is believed, that the data identified above would be sufficient to describe a single shipment in most environments in which an embodiment of the invention is deployed.

A charge table may include data relating to the charges (or costs) associated with the shipment. For example, data columns relating to the currency type, the exchange rates, the charge amount, charge code and the like may be included in this table. The charge table may reference the shipment identifier table by the shipment record number and the shipment consolidation detail table by the consolidation record number. A unique charge record number may be used to uniquely identify each row of charge data. Some of this data may be calculated from other data in the other tables described herein.

A shipment header table may be used to provide additional details about a shipment of products. Acting as a primary key may be a unique shipment record number which uniquely identifies a row of data in this table. The shipment header table may have a foreign key column referencing the consolidation record number of the shipment consolidation detail table. Included in the shipment header table may be data relating to the broker, an identifier used by the exporter, destination data, data relating to the weight and volume of the shipment, insurance information data, importer identifier and the like.

An economic transaction table provides economic data relating to a shipment. This may include data relating to invoice information (date, number, etc.), currency used for the transaction, government data (e.g., importation allowed, exportation allowed, restrictions, etc.), terms of sale and payment data, manufacturing information (e.g., country of manufacture, etc.), and other data. Each row of data in the economic transaction data table should, in most instances, be uniquely identified. Unique identification may be provided by, for example, a unique economic transaction number. Each row of data in this table may reference, through use of a foreign key column, the consolidation record number of the shipment consolidation detail table and the shipment record number in the shipment header table.

A packaging table may be provided to provide general packaging details for each shipment. Each row of data may be uniquely identified. The packaging table may reference, using a foreign key column, one of the other tables' primary keys. Included in this table may be data about the number of packages for the shipment identified, package(s) weight(s), package measurements (height, width, length), measurement dimensions, insured values and the like.

A line item detail table may provide data relating to the each of the products (i.e., each line) of the shipment manifest. Accordingly, rows of data in this table may reference one or more of the primary keys of the economic transaction table, the shipment consolidation detail table, the shipment header table and the packaging table. Each row of data may be uniquely identified. Additionally, data columns may be provided to sufficiently describe each item. This may include, for example, details about the description, dimensions, country of order, unit of measure, FOB status, weights, number of pieces, purchase data (costs number, dates), total costs and the like.

A customs entry data table provides custom data used to describe customs data for a shipment. A unique entry record uniquely identifies each row of data in this table and is, as indicated above, referenced by the shipment identifier table. This table may include data relating to a shipment's bond data (number, type and amount), warehouse data (number, forwarding warehouse, transfer warehouse), document information, use of brokerage indicator, release data (time, date, etc.), duty and tax data (e.g., duty payable, value added tax data, excise tax, total payable, deposit paid, etc.), assessment data, entry status data and the like.

An authorization data table provides data regarding the authorization of goods to be exported or imported into various jurisdictions. Rows of data may be uniquely identified and be referenced by rows of data in the shipment header detail table. This table may indicate whether authorization for import/export has been granted and, if so, by whom and the title of the person authorizing the import/export of the goods.

A port shipment table provides data relating to the ports used during shipment of the goods. Each row may be uniquely identified and rows of data may be referenced by the shipment consolidation detail table. This table may include data relating to the ports, the country, the broker used, the shipment used at the port identified and the like.

A document table provides data relating to the documents used, required or related to a particular shipment. The document table, which may uniquely identify each row of data, may reference the country table described below. The document table provides data relating to the format of documents required to complete a shipment. These documents, which may be printed by operator of IIES 100 (FIG. 1) and provided to the various members of the supply chain and the various governmental organizations, generally have a specific format. Data about these specific formats are stored in the document table. The document or form may itself, in an unpopulated or template format, be stored in this table. Included in this table is data that may relate to, for example, the document name, description, width, height, copies required, lines per page and the fields in the document that require population. Fields requiring population may be indicated by a Boolean flag or operator.

A country data table, which as indicated above, may be referenced by rows of data in the document table which indicate the documents required for a shipment, provides general data relating to countries affecting a shipment. Rows in this table may be uniquely identified and include data relating to the country name, code, currency, a general tariff indicator and the like.

A contact data table provides contact data for each entity which is involved in a shipment. Rows of data may be uniquely identified and reference shipment data. The rows of data in the contact data table may identify each entity by address, name, country, state or province, EDI account number and codes, account security number, tax and/or manufacturer identifier, broker indicator, bond information, contact name, title and address information (e.g., phone number(s), fax number(s), e-mail address(es) and the like), etc. Additionally (or contained within a separate table) data relating to the accounting information for each contact may also be included in contact data table. This may include data relating to payment terms, brokerage amounts, payment dates, sales taxes, sales, current balance, invoice information, tax identifiers, tax licenses and the like.

A waybill data table, which may reference the shipment header table and the shipment consolidation data tables, provides data relating to waybill information. Rows of data, which may be uniquely identified, may include data relating to, for example, waybill description, manifest data (to, from), reship information (reship waybill, costs, carrier, destination), packaging information, etc.

A tax code table provides general information relating to harmonized tax systems, tariffs, duties and excise taxes. This information may be referenced by the item master data table described below. Data included in this table (which may be separated into smaller tables, if desired), includes country information (name and code), tariff, harmonized system and excise tax data (treatment, maximum and minimum rates, codes, effective and expiry dates, etc.) and the like. This data is used to determine the various fees required for a shipment.

An item classification table provides, for items entering a specified country or jurisdiction, data relating to tariff data (codes and rates), duty data (codes and rates), value added and excise tax data (codes and rates), last date for which an update of the information was completed, quota data and the like. The item classification table may be referenced by the Item Master data table and Line Item Detail table.

An Item Master data table provides a sufficient description for each item identified in the line item detail table to determine the tariffs, taxes and duties that may be due during the shipment. Accordingly, each row in the item master data table references the tax code table and the line item detail table. Provided in this table is data relating to, for example, an item's part number, description, country of origin, unit cost, producer, unit of measure, government identifiers (e.g., Food and Drug Administration identifier) and the like.

An OGD table provides, for a commodity entering a specified country or jurisdiction, data required by governmental departments (other that the Customs department) for importing the commodity. This data is required for entry into the jurisdiction to assess health and safety risks, quotas, etc.

Figure 5:
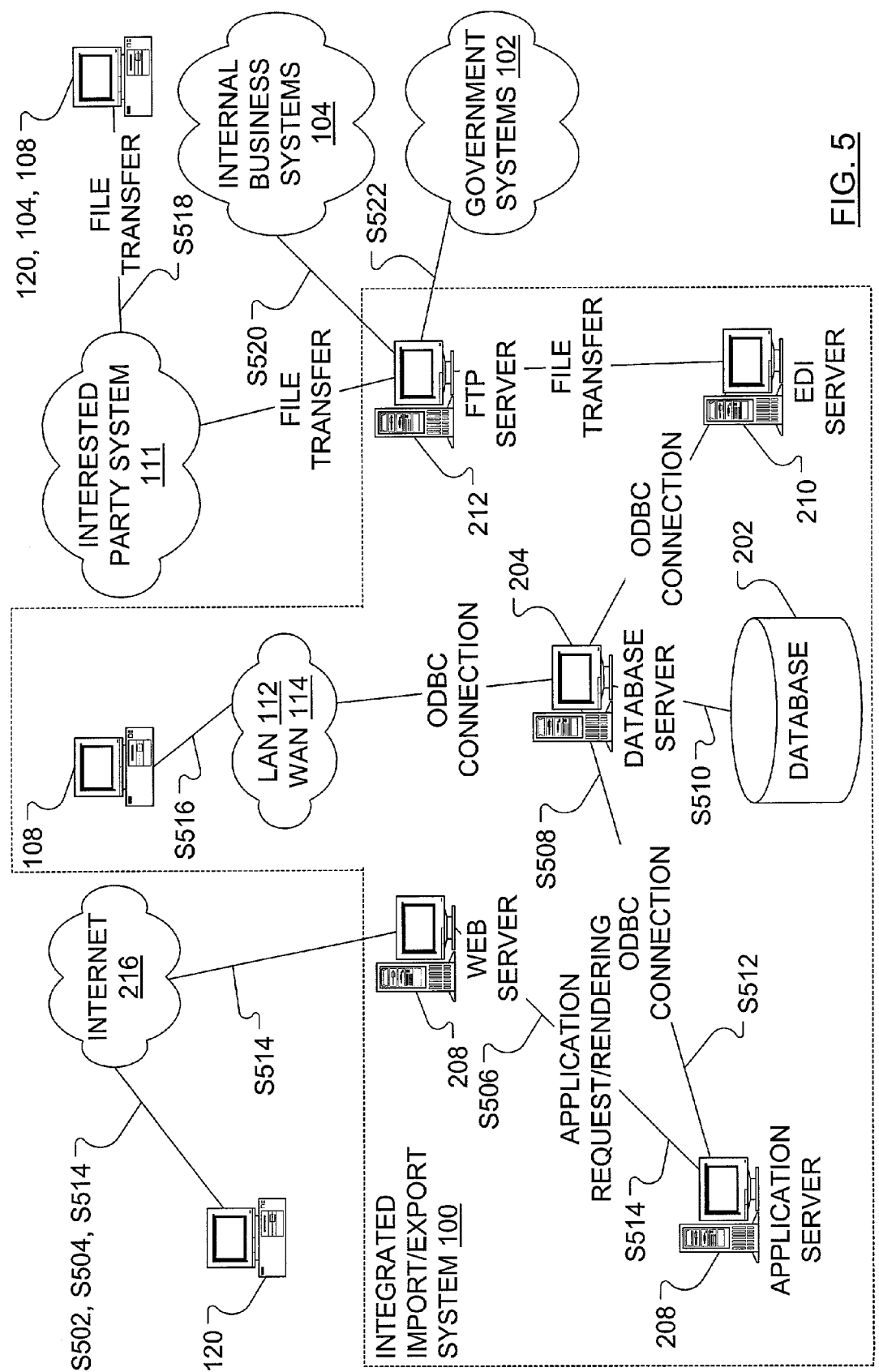
FIG. 5 illustrates data flow between the components illustrated in FIGS. 1 and 2.

The operations and data flows of IIES 100 (FIG. 1) and the systems of the government 102 and supply chain member systems 104 are illustrated in FIG. 5. In the exemplary data flows illustrated, it assumed that the following parties are involved in a single shipment of goods from a first country (e.g., the United States) to a second country (e.g., Canada). The goods being shipped are manufactured in the United States by a first party to the transaction—the manufacturer/exporter—and are being shipped to a second party in Canada—the customer/importer. Also involved in this transaction is the U.S. government—which requires export documentation so that goods can be exported from the U.S.—and the Canadian government—which requires import documentation so that the goods can be imported into Canada. Additionally, a single shipping organization is involved together with a customs broker/logistics service provider and a warehousing company in Canada. In this embodiment the customs broker operates the IIES that is accessed by, or provides information to, the above-identified parties.

As will be appreciated by those of ordinary skill in the art, changes (e.g., modifications, additions, deletions) to the exemplary parties identified above may be made. In fact, in most typical shipments many additional parties may be involved. For example, in many instances, the exporter is often not the manufacturer of the goods involved. Similarly, it is often the case that the importer is not the ultimate customer/consumer of the goods involved. However, for ease of understanding, the example used to illustrate the data flows illustrated in FIG. 5 involves a lesser number of parties than may be the case in other situations.

Initially, a computer terminal 120 of a party to the transaction initiates communication with central server system 116 (step S502). Communication in the exemplary embodiment between computer terminal 120 and central server system 116 is initiated via the internet 216 and web server 208 through use of conventional software (e.g., TCP/IP and HTTP protocols using a web browser and web server software). It is assumed, for this example only, that communication is initiated by the exporter/manufacturer. However, other parties involved could also initiate the process illustrated in FIG. 5.

Computer terminal 120 of the exporter is presented, by web server 208, with a conventional web page (step S504) that may require the exporter to provide identification data to determine the authority of the exporter to communicate with IIES 100. Furthermore, the authority of the exporter to modify a record may also be determined. After authentication has been completed, the exporter is provided with an interface (an input data web page) requesting data regarding a shipment. At this point, computer terminal 120 may transmit data indicating that review/update of a previous shipment is requested or a new transaction is to be initiated. It is assumed, for this example, that the computer terminal 120 transmits to web server 208 a request for commencement of a new shipment.

Upon receipt of this commencement request, web server 208 transmits the commencement data to application server 206 via network 200 (FIG. 2) (step S506). Application server 206, after parsing the commencement data and generating an appropriate query, e.g., a CREATE command in Structured Query Language (SQL), accesses database server 204, and more particularly database 202 (step S508). Access to database 204 may be performed using native database client software or, as illustrated, ODBC facilities. Upon receipt of the data, an entry in database 202 is created which will uniquely identify the transaction (S510). The entry in database 202 may be created in the shipment identifier table (described above). Database server 204 may create additional entries in the other tables identified above thus linking the shipment identifier table with these other entries. It should be noted that many or most of the fields in the various tables specific to this particular shipment will be empty at this point. Many (although not necessarily all) of these empty fields will be populated by the various parties as the relevant data becomes available. For example, information from a government agency relating to confirmation that duties have been fully paid may not become available until after delivery of the goods to the importer/customer.

Other information may become available some time between initiation of the shipment and the delivery of the goods. In order to include this information in the tables, embodiments of the invention may, either automatically or when prompted by a user, query external systems with an aim to populating empty fields in the tables. For instance, the central server system 116 may query the government server 106 to determine clearance status of individual shipments.

At this point, database server 204 may forward to application server 206 the identifier which uniquely identifies the transaction (step S512). The unique transaction identifier may then be transmitted to computer terminal 120 through operation of application server 206 and web server 208 (step S514). As will be appreciated by those of ordinary skill in the art, data other than the unique transaction identifier may be used, in the alternative, to uniquely identify a particular transaction, e.g., name(s) of party(ies) involved, date of shipment, invoice number, etc.

Once the process has commenced (i.e., step S502), parties to the transaction may also connect to IIES 100 to retrieve, transmit or modify data relating to a transaction. For example, once the exporter has received confirmation that the process to ship goods has been initiated (i.e., after receipt of a transaction identifier), the exporter may transmit to IIES 100 (through operation of web server 208, application server 206 and database server 204) additional details related to the transaction. Additionally, the broker, shipping organization, or importer may connect (via interested part system 111, LAN 112 or WAN 114) to IIES 100 and provide additional data for the transaction (step S516, step S518). The various parties may establish data communication with IIES 100 using the internet 216 or, in case of the broker, internal LAN/WAN 112, 114. However, if desired, the broker to the transaction may also connect using the internet or other data networks. The information provided to IIES 100 by the various parties will be used by IIES 100 to populate the relevant data fields in the tables identified above.

In addition to the foregoing, IIES 100 may initiate data communication with systems external to IIES 100. EDI server 210, based on data stored by database 202, may establish communication with the internal business systems 104 of a supply chain member (e.g., an ERP system)—a party to the transaction (step S520). Communication in such an instance may be initiated by EDI server 210 using the operational facilities of communications server 212. Using data regarding EDI facilities of a party to the transaction (e.g., account information, network address, etc.), EDI server 210 may access the supply chain member's electronic data records to request or retrieve pertinent information (e.g., delivery dates, item details, accounting details, etc.), and/or transmit pertinent information (e.g., invoice numbers, accounting details, updates on the shipment process, release information, etc.). This exchange of data may be performed using various conventional data exchange protocols such as, for example, an electronic data file exchange using ftp. The data provided by the parties is received ultimately by database server 204 to populate database 202 and, primarily, the following tables identified above: the basic shipment consolidation detail table, the charge table, the shipment header table, the economic transaction table, the packaging table, the line item detail table, the customs entry data table, the authorization data table, the port shipment table, the contact data table, the waybill data table, the item master table and the OGD data table.

In addition, IIES 100 may also initiate communication with government systems 102 (step S522). Such communication, which may use the facilities of communications server 212, may involve IIES 100 requesting, retrieving or transmitting data to a government system 102. Information that may be retrieved or requested by IIES 100 include, for example, duty, tariff and excise rates and codes, customs forms (which are to be populated with data stored in database 202), custom clearance confirmation and authorization and the like. Information that may be transmitted to government system 102 may include, for example, completed customs forms, accounting information, electronic funds transfers and the like. If a particular government agency is not enabled for electronic communication, printed data from this agency may be entered into IIES 100 by users of computer terminals 108. The data obtained from the various government agencies is used, primarily, to populate the following tables of database 202: the shipment consolidation table, the customs entry table, the country data table, the tax code table and the item classification table.

As information is received by IIES 100 and stored in the various tables of database 202, various forms (electronic or hard copies) may be required by various persons associated with the parties to the transaction. For example, a truck driver may require a paper manifest to instruct the driver on where to the pick up and deliver the goods involved, a description of the goods, and various forms required at a border. These documents may be electronically transmitted (e.g., a Public Document Format—PDF—document, an e-mail, a facsimile or the like) to the shipping organization where the document can be provided to the driver. Further, as the driver commences transport of the goods, database 202 may be updated. As a consequence of these updates, additional (and up to date) documentation may be provided by IIES 100 directly to the truck driver using various communication means (e.g., wireless networks, facsimile transmission, etc.).

Embodiments of the present invention may enable importers or exporters to analyze shipments in detail, either retrospectively (i.e., analyze shipments which have already occurred) or prospectively (i.e., analyze proposed shipments). For example, an exporter, which typically has access only to data relating to the export of goods from a first jurisdiction, may want to analyze the data (e.g., costs) involved with the entire process of exporting the goods from the exporter's jurisdiction and then importing the goods into the importer's jurisdiction. Moreover, an exporter or importer, may analyze a proposed shipment from a first jurisdiction to a second jurisdiction and realize that trans-shipment of the goods through a third jurisdiction, for example, may result in tremendous advantages (e.g., a costs savings).

In operation, the application server 206 (FIG. 2) may receive, from an exporter, an indication of a proposed shipment from a first jurisdiction to a second jurisdiction. Based on this indication, the application server 206 may review data in the database 202 that relates to previous shipments from the first jurisdiction to the second jurisdiction. This data may be used to derive a metric (e.g., a cost breakdown) for the proposed shipment. This metric may then be provided to the exporter. The application server 206 may subsequently receive a suggestion of an intermediate jurisdiction. Based on this suggestion, the application server 206 may review data in the database 202 that relates to previous shipments from the first jurisdiction to the intermediate jurisdiction and previous shipments from the intermediate jurisdiction to the second jurisdiction. This data may be used to derive a metric for routing the proposed shipment through the intermediate jurisdiction. Alternatively, given enough processing power at the central server system 116, metrics may be determined corresponding to multiple alternative intermediate jurisdictions. An optimal one of the metrics may point to an optimal intermediate jurisdiction, which may then be suggested to the exporter for consideration.

From the foregoing, it will be apparent to those of skill in the art that, as a result of a central repository of data fully describing a shipment or transaction and involving all parties to the transaction, a reduction in costs and time together with a simplification of the entire process can be achieved. Additionally, reductions in the amount of errors and overlap in data creation may be eliminated. Additionally, as more government agencies become electronically connected to the parties the agencies service, embodiments of the present can be quickly and easily configured to interact with these agencies' electronic systems thus reducing the need for manual entry of data into database 202. Furthermore, since database 202 is constantly being updated by parties involved in a transaction, delays in shipment caused by missing or lost forms or the like may be reduced. A further advantage provided by IIES 100, as a result of the completeness of the shipment records maintained by database 202, is the ability to analyze historical data which may be used to optimize future shipments. Other advantages of embodiments of the present system will also be apparent.

While one (or more) embodiment(s) of this invention has been illustrated in the accompanying drawings and described above, it will be evident to those skilled in the art that changes and modifications may be made without departing from the invention. All such modifications or variations are believed to be within the scope of the invention as defined by the claims appended hereto.

What is claimed is:

1. An integrated import/export system comprising:
   a database containing data related to a plurality of shipping transactions,
     each shipping transaction of said plurality of shipping transactions relating to a transfer of goods, between at least two jurisdictions,
     with the data organized into records associated with each shipping transaction of said plurality of shipping transactions,
     where each record includes a primary key, where said primary key uniquely identifies said shipping transaction associated with said record,
     where each record also includes data required to process a plurality of steps of said shipping transaction associated with said record
       including data required to process a step of exporting of a product from a first jurisdiction and data required to process a step of importing of said product to a second jurisdiction;
   a database server hosting said database; and
   an application server in communication with said database server for providing a user interface to any of a plurality of clients, each client associated with a member of a supply chain for a particular shipping transaction of said plurality of shipping transactions, said interface allowing said at least one client to modify a portion of a record associated with said particular shipping transaction if said member associated with said client has security authorization to modify said portion.

2. The integrated import/export system of claim 1 further comprising an electronic data interchange server in communication with said database server.

3. The integrated import/export system of claim 2 wherein said electronic data interchange server allows said system to exchange information with databases and data repositories of said member of said supply chain.

4. The integrated import/export system of claim 2 wherein said electronic data interchange server allows access to databases maintained by governments of said jurisdictions.

5. The integrated import/export system of claim 1 further comprising a file transfer protocol server for enabling receipt and transmission of said records using the file transfer protocol.

6. The integrated import/export system of claim 1 further comprising a hyper-text transfer protocol (HTTP) server for enabling receipt of a request for a page and transmission of said page to an origin of said request.

7. A method of operating an integrated import/export system comprising:
maintaining a database containing data related to a plurality of shipping transactions,
each shipping transaction of said plurality of shipping transactions relating to a transfer of goods between at least two jurisdictions;
with the data organized into records associated with each shipping transaction of said plurality of shipping transactions,
where each record includes a primary key, where said primary key uniquely identifies said shipping transaction associated with said record,
where each record also includes data required to process a plurality of steps of said shipping transaction associated with said record
including data required to process a step of exporting of a product from a first jurisdiction and data required to process a step of importing of said product to a second jurisdiction;
providing an interface for accessing particular ones of said records in said database to a member of a supply chain for said particular ones of said plurality of shipping transactions;
receiving, from said member, an instruction to modify one of said particular ones of said records relating to said particular one of said plurality of shipping transactions;
determining whether said instruction to modify relates to a portion of said one of said records for which said member has modification authority; and
modifying said one of said records according to said instruction if said member has said modification authority.

8. The method of claim 7 further comprising:
receiving a query for information stored in databases maintained by governments of said at least two jurisdictions;
responsive to receiving said query, accessing said databases maintained by said governments of said at least two jurisdictions to retrieve a result; and
presenting said result of said accessing to a source of said query.

9. The method of claim 8 further comprising submitting documentation for entry into said databases maintained by said governments of said at least two jurisdictions.

10. The method of claim 8 further comprising querying said databases maintained by said governments of said at least two jurisdictions to determine a clearance status of a given shipping transaction.

11. A computer readable medium containing computer-executable instructions which, when performed by a processor in an import/export system, cause the processor to:
maintain a database containing data related to a plurality of shipping transactions,
each shipping transaction of said plurality of shipping transactions relating to a transfer of goods between at least two jurisdictions;
with the data organized into records associated with each shipping transaction of said plurality of shipping transactions,
where each record includes a primary key, where said primary key uniquely identifies said shipping transaction associated with said record,
where each record also includes data required to process a plurality of steps of said shipping transaction associated with said record
including data required to process a step of exporting of a product from a first jurisdiction and data required to process a step of importing of said product to a second jurisdiction;
provide an interface for accessing particular ones of said records in said database to a member of a supply chain for said particular ones of said plurality of shipping transactions;
receive, from said member, an instruction to modify a particular one of said records relating to said particular one of said plurality of shipping transactions;
determine whether said instruction to modify relates to a portion of said one of said records for which said member has modification authority; and
modify said one of said records according to said instruction if said member has said modification authority.

12. A record editing system in communication with an integrated import/export system, said record editing system operable to:
display an interface to a member of a supply chain for a particular shipping transaction, said interface allowing interaction with a database containing data related to a plurality of shipping transactions,
each shipping transaction of said plurality of shipping transactions relating to a transfer of goods between at least two jurisdictions;
with the data organized into records associated with each shipping transaction of said plurality of shipping transactions,
where each record includes a primary key, where said primary key uniquely identifies said shipping transaction associated with said record,
where each record also includes data required to process a plurality of steps of said shipping transaction associated with said record
including data required to process a step of exporting of a product from a first jurisdiction and data required to process a step of importing of said product to a second jurisdiction,
said database maintained at said integrated import/export system;
receive, from said member, instructions to modify a record relating to said particular shipping transaction;
determine whether said instructions to modify relate to a portion of said one of said records for which said member has modification authority; and modify said one of said records according to said instructions if said member has said modification authority.

13. A record editing system in communication with an integrated import/export system, said record editing system comprising:

an output means for displaying an interface to a member of a supply chain for a particular shipping transaction, said interface allowing interaction with a database containing data related to a plurality of shipping transactions, each shipping transaction of said plurality of shipping transactions relating to a transfer of goods between at least two jurisdictions;

with the data organized into records associated with each shipping transaction of said plurality of shipping transactions, where each record includes a primary key, where said primary key uniquely identifies said shipping transaction associated with said record, where each record also includes data required to process a plurality of steps of said shipping transaction associated with said record including data required to process a step of exporting of a product from a first jurisdiction and data required to process a step of importing of said product to a second jurisdiction, said database maintained at said integrated import/export system;

an input means for receiving, from said member, instructions to modify a record relating to said shipping transaction; and a processing means adapted to:

determine whether said instructions to modify relate to a portion of said one of said records for which said member has modification authority; and modify said one of said records according to said instructions if said member has said modification authority.

* * * * *